United States Patent Office 3,096,453
Patented July 2, 1963

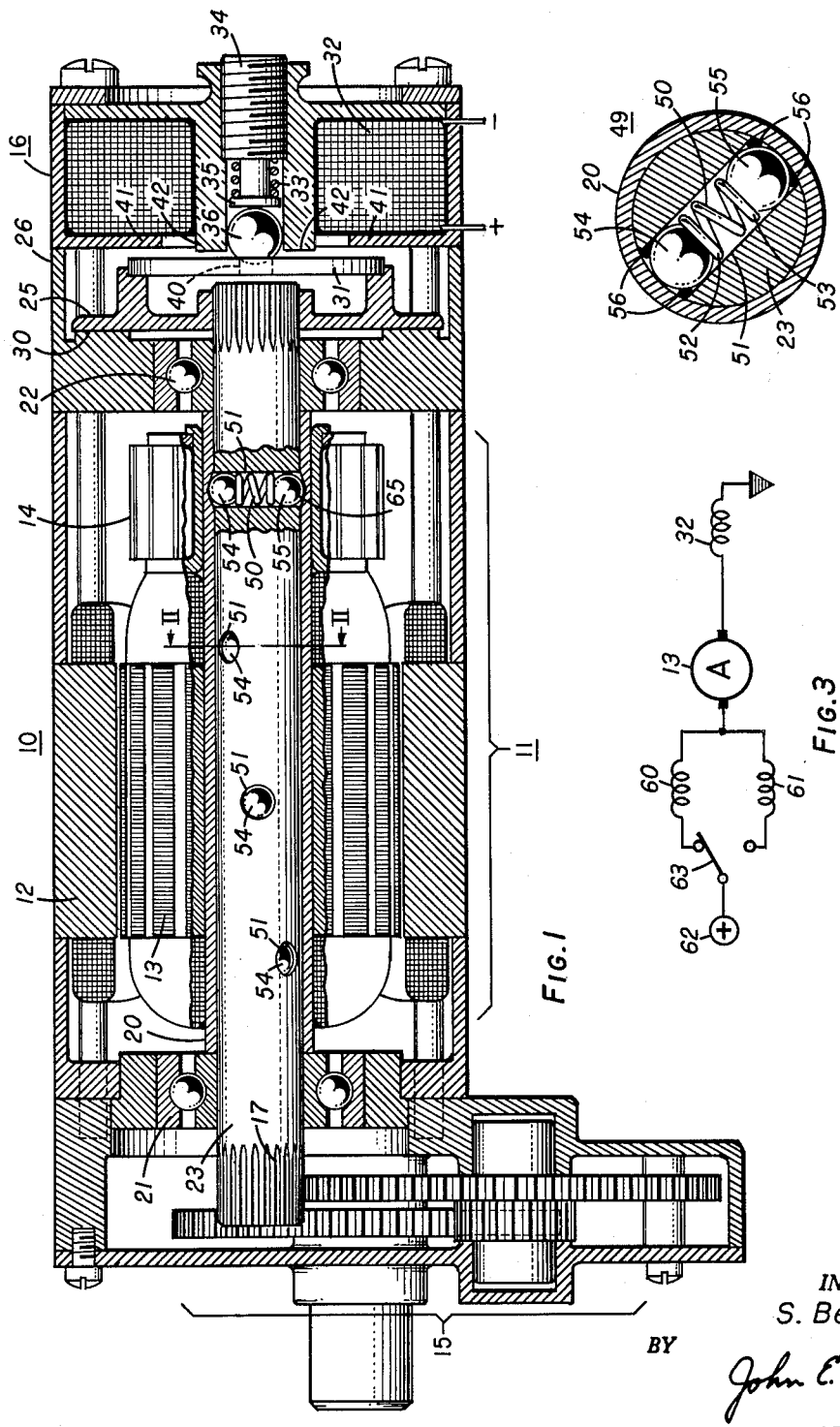

3,096,453
ELECTRIC MOTOR DRIVE SYSTEM
Samuel M. Behar, Glendale, Calif., assignor to The Bendix Corporation, North Hollywood, Calif., a corporation of Delaware
Filed June 14, 1961, Ser. No. 117,062
5 Claims. (Cl. 310—77)

This invention relates to electromechanical actuators and more particularly to drive systems for rotary actuators including provision for automatically applying a brake to the system upon the de-energization of the actuator.

Electromechanical actuators have heretofore been developed employing the motor which is coupled through a gearing system to a load including a brake which is automatically energized at the moment that the motor is de-energized to stop the load or motor or both rapidly. One common design for such drive systems includes a motor having a shaft to which is coupled a combination clutch and brake plate. The plate is axially movable in one direction to meet with a matching clutch plate coupled to the load and in the opposite direction to bear against a braking surface. This arrangement allows the selective application of power and braking to the motor, depending upon the position of the disc member. One disadvantage of the system is that the braking cycle includes the application of the braking forces either to the motor or the load but not to both. In the usual arrangement braking is applied to the load and the motor continues to turn on freely under its own momentum.

In another version of such driven mechanism a second brake is used for the motor energized simultaneously with the load brake. However, the addition of a second brake adds to the size and weight of the actuator without increasing the output power.

With this state of the prior art in mind, it is the general object of this invention to provide an electromechanical actuator drive system giving near instantaneous stopping of the load upon de-energization of the driving motor.

Another object of this invention is to provide such a drive system in which the mass of the drive system and consequently its momentum which is subject to direct braking action is a minimum.

Still another object of this invention is to provide such a drive system in which the armature of the motor is also subjected to braking action without the necessity of the second brake.

Another object of this invention is to achieve such a drive system in which the size and weight of the system is no larger than required by the motor and a single brake.

These objects are all achieved in accordance with this invention, one embodiment of which comprises: a motor having an armature with a hollow shaft. Coaxially positioned within the hollow shaft is the output or load shaft. Coupled to the load shaft is a braking disk which is normally spring-biased against a surface of the brake housing in the on condition. A solenoid winding may be connected in series with the energizing windings of the motor and the solenoid winding is operatively connected to displace the braking member from its mating surface when the motor and solenoid are energized.

The coupling between the motor armature and the load shaft is in the form of a plurality of spring-pressed ball members in the load shaft bearing against the inner surface of the armature shaft.

One feature of this invention resides in the coupling of a motor to a load shaft by means of coaxially mounting the load shaft within the armature shaft with the operative connection between the two in the form of spring-biased means bearing on the inner surface of the armature shaft.

Another feature of this invention resides in the use of ball-bearing members as the coupling between the armature and load shaft.

Still another feature of the invention resides in the presence of a race in the armature shaft for at least one of the ball couplings to provide for axial alignment between the two shafts and retention of the load shaft in proper axial position.

These and other features of this invention may be more clearly understood from the following detailed description and by reference to the drawing, in which:

FIG. 1 is an axial section of an actuator employing this invention;

FIG. 2 is a section taken along line II—II of FIG. 1 of the armature load shaft assembly of FIG. 1; and FIG. 3 is an electrical schematic representation of the actuator.

Now referring to FIG. 1, an actuator 10 employing this invention includes basically a motor 11 having a stator 12, and an armature or rotor 13, and a commutator assembly 14 with the armature 13 coupled to an output gear train 15. The actuator also includes a brake assembly 16 which is actuated whenever power is removed from the motor 11 in order to stop the load.

The major factor in determining the speed with which the armature 13 can be brought to rest is its momentum which is a function of its mass and the speed of rotation when the brake 16 is applied. In typical installations the armature rotates between 10,000 and 40,000 r.p.m. In rotary actuators of all types, the mass of the armature is typically relatively large compared to the output gear train and the armature shaft alone. Where it is desired to stop the armature from rotation almost instantaneously upon de-energization of the motor the braking forces required are quite high, requiring relatively large brakes. However, in accordance with this invention, the armature 13 has merely a hollow tube 20 rather than a solid shaft carrying the armature winding and laminations as well as the commutator 14.

The hollow tube 20 is carried coaxially on a solid shaft 23 which is mounted for rotation in a pair of ball bearing assemblies 21 and 22. The end of shaft 23 extending beyond the ball bearing assembly 21 includes integral gear teeth forming the input pinion gear 17 to gear train 15. The opposite end of shaft 23 extends beyond the ball bearing assembly 22 and carries a brake disc 25 keyed to the end of shaft 23. The brake disk 25 is positioned within a brake housing 26 having an annular braking surface 30 against which the brake disk 25 is normally pressed by a washer 31. The washer 31 is pressed against the brake disk 25 by a spring 33 retained in the brake housing 26 by an adjustable screw stop 34 with the spring 33 pressing against a plunger 15 which, inturn, bears on a ball 36 resting in the central opening 40 of washer 31. Therefore, without the winding energized the brake disk 25 is spring-biased against the braking surface 30 of the housing 26 and the shaft 23 is restrained from rotation. The washer 31 actually is the armature of solenoid having a winding 32. Whenever the solenoid winding 32 is energized the annular washer armature 31 is drawn toward a pair of pole pieces 41 and 42 of the solenoid thereby releasing the brake disk 25 and allowing the shaft 23 to turn freely.

The only operating connection between the tube 20 of the armature 13 and the shaft 23 is in the form of a plurality of spring loaded ball bearing assemblies 49 resting in apertures 51 in the shaft 23 extending at right angles to the axis of the shaft 23 and displaced consistently both longitudinally and angularly from each other.

The details of the bearing coupling between shaft 23 and tube 13 may best be seen in FIG. 2. The transverse aperture 51 passes through the axis of the shaft 23 and positioned centrally within the aperture is a helical spring 50 having parallel end turns 52 and 53 forming seats for respective ball bearings 54 and 55. The spring 50 urges the bearings 53 and 54 out of the apertures 51 and against the inner wall of tube 20. A small amount of grease 56 on the outer region of both ends of the aperture prevents the bearings 53 and 54 from galling. The line contact by the balls 54 and 55 with the end turns 52 or 53 of the spring 50 prevents the balls from rotating easily and thereby the assembly operates as a point contact friction drive rather than a low friction rolling bearing. In a typical application the compressive force on the spring is in the order of 2.5 pounds and the measured coefficient of friction between the ball and the inner surface of tube 20 is approximately 0.2 whereby the frictional force exerted by one ball on the inner surface of the tube is approximately 0.5 pound. As illustrated in FIG. 1 a plurality, for example, four such assemblies 49 are included in the shaft 23 with a total of eight ball bearings on the inner surface of tube 13. The total frictional force therefore between the tube 20 and shaft 23 is approximately 4 pounds. In one typical application the torque requirement of the system is 5 inch-ounces and the output shaft has a diameter of 3/16 inch. The output force, therefore, would be in the order of 45 ounces or less than 3 pounds, a value well below the frictional force between the tube 20 and shaft 23. Therefore, no slippage between the motor driving tube 13 and the shaft coupled to the load 23 would be encountered in normal loaded operation. With the motor 11 energized and no braking force supplied to the shaft 23 the tube 20 and shaft 23 rotate together as a single unit to drive the load.

Whenever the motor is de-energized and the brake engaged the braking force developed between the brake disk 25 and the braking surface 30 of the housing 26 exceeds by a factor of approximately 4 the force necessary to overcome the frictional engagement between the balls and the tube 13 and thereby brings the shaft 23 and load to a halt. The mass of the shaft 23 is far less than that of the entire armature 13 and the load operating at lower speed has low momentum so that the load and shaft 23 are rapidly brought to a halt. In a typical operation where the armature is turning at 35,000 revolutions per minute the shaft will turn approximately 2 to 3 revolutions after engagement of the brake before stopping. The time required to decelerate from 35,000 r.p.m.'s to zero in 2 to 3 revolutions is less than 10 milliseconds, well within operating tolerances for such rapid acting actuator systems. The relatively heavy armature and tube 13 continues to turn after the motor is de-energized owing to the greater momentum of the armature. However, the ball members bearing on the inner surface of tube 13 with the shaft 23 stopped or being decelerated places a substantial frictional load on the tube 20 of armature 11 tending to bring it also to a rapid halt. Typically the armature would make 2 to 3 revolutions before stopping after engagement of the brake 16.

The most common operating circuit for the motor and brake is shown in the simple diagram of FIG. 3. The stator includes a pair of windings 60 and 61 for forward and reverse direction operation connected selectively to a power source 62 by a double throw switch 63. The armature 13 and brake winding 32 are connected in series with the two stator windings so that one stator winding, the armature and the brake all energize simultaneously. Circuits with the brake winding in parallel with the motor windings can also be employed. Similarly the application of this invention is not limited to the type of motor winding shown here.

As may be seen from the above description, the modification of a conventional rotating actuator to employ the concept of this invention may be accomplished by the substitution of a hollow armature shaft 20 and coaxial load shaft 23 with an internal frictional drive 49. The drive itself offers simplicity in that it is made of a pair of ball bearings 54 and 55 with a common spring 50 urging the bearings against the inner wall of the hollow armature shaft 20. The overall weight and volume of the actuator is not increased while the time required to stop the load is reduced typically by 95%.

In a preferred form of this invention the inside diameter of the hollow shaft of the armature has a uniform diameter except for one portion, including a groove 65, seen in FIG. 1, which forms a race for one bearing assembly 49. The race 65 provides axial alignment for the shaft 23 within the tube 20.

Although for the purpose of explaining the invention a particular embodiment thereof has been shown and described, obvious modifications will occur to a person skilled in the art, and I do not desire to be limited to the exact details shown and described.

I claim:
1. An electromechanical actuator comprising:
   a motor including a stator and an armature having a shaft;
   the shaft of said motor armature comprising an outer tubular member fixed to said armature and a load shaft positioned coaxially within said tubular member and extending out of at least one end of said tubular member;
   means journaling said tubular member for rotation upon the energizing of the motor;
   means for coupling the load to be driven by said motor to said load shaft; and
   a plurality of spring-biased members positioned in transverse recesses in said shaft in frictional engagement with the inner surface of said tubular member to transmit torque from said tubular member to said load shaft.

2. An electromechanical actuator comprising:
   a motor including a stator and an armature having a shaft;
   the shaft of said motor armature comprising an outer tubular member fixed to said armature and a load shaft positioned coaxially within said tubular member and extending out of at least one end of said tubular member;
   means journaling said tubular member for rotation upon the energizing of the motor;
   means coupling the load to be driven by said motor to said load shaft;
   said load shaft including at least one recess extending at a right angle with respect to the axis of said shaft;
   spring means positioned in said recess; and
   a ball within the recess bearing against the inner surface of said tubular member to transmit torque from said tubular member to said load shaft.

3. An electromechanical actuator comprising:
   a motor including a stator and an armature having a shaft;
   the shaft of said motor armature comprising an outer tubular member fixed to said armature and a load shaft positioned coaxially within said tubular member and extending out of at least one end of said tubular member;
   means journaling said tubular member for rotation upon the energizing of the motor;
   said load shaft having a plurality of longitudinally spaced apertures extending therethrough at a right angle with respect to the axis of said shaft;
   a compression spring positioned centrally in each of said apertures;
   ball members positioned within said apertures at each end of the apertures;
   said compression springs urging the ball members outward into contact with the inner surface of said tubular member to transmit torque from said tubular member to said load shaft.

4. The combination in accordance with claim 3 wherein the inner surface of said tubular member includes a tapered recess portion in the region of one of the apertures in said load shaft, the tapered recess of said tubular member forming a race for the ball members, thereby axially aligning said tubular member and load shaft.

5. An electromechanical actuator comprising:
 a motor including a stator and an armature having a shaft;
 the shaft of said motor armature comprising an outer tubular member fixed to said armature and a load of shaft positioned coaxially within said tubular member and extending out of at least one end of said tubular member;
 means journaling said tubular member for rotation upon energization of the motor;
 means coupling the load to be driven by said motor to said load shaft;
 means coupled to said load shaft for selectively applying braking force to said load shaft;
 said load shaft including at least one recess extending at a right angle with respect to the axis of said shaft;
 spring means positioned in said recess; and
 a ball within the recess bearing against the inner surface of said tubular member to transmit torque from said tubular member to said load shaft.

References Cited in the file of this patent
UNITED STATES PATENTS

| | | | |
|---|---|---|---|
| 1,274,722 | Lacey | Aug. 6, | 1918 |
| 2,373,812 | Coop | Apr. 17, | 1945 |
| 2,677,256 | Donadt | May 4, | 1954 |
| 2,745,977 | Tesh | May 15, | 1956 |